US010845525B2

(12) United States Patent
Schultz et al.

(10) Patent No.: US 10,845,525 B2
(45) Date of Patent: Nov. 24, 2020

(54) IMAGING LIGHT GUIDE WITH GRATING-EXPANDED LIGHT DISTRIBUTION

(71) Applicant: Vuzix Corporation, West Henrietta, NY (US)

(72) Inventors: Robert J. Schultz, Victor, NY (US); Paul J. Travers, Honeoye Falls, NY (US)

(73) Assignee: Vuzix Corporation, West Henrietta, NY (US)

( * ) Notice: Subject to any disclaimer, the term of this patent is extended or adjusted under 35 U.S.C. 154(b) by 0 days.

(21) Appl. No.: 16/470,225

(22) PCT Filed: Dec. 13, 2017

(86) PCT No.: PCT/US2017/066181
§ 371 (c)(1),
(2) Date: Jun. 16, 2019

(87) PCT Pub. No.: WO2018/125574
PCT Pub. Date: Jul. 5, 2018

(65) Prior Publication Data
US 2020/0088932 A1 Mar. 19, 2020

Related U.S. Application Data

(60) Provisional application No. 62/441,212, filed on Dec. 31, 2016.

(51) Int. Cl.
*F21V 8/00* (2006.01)
*G02B 27/01* (2006.01)

(52) U.S. Cl.
CPC .......... *G02B 6/0036* (2013.01); *G02B 6/006* (2013.01); *G02B 6/0016* (2013.01);
(Continued)

(58) Field of Classification Search
CPC .... G02B 6/0036; G02B 6/006; G02B 6/0016; G02B 6/00; G02B 27/0172;
(Continued)

(56) References Cited

U.S. PATENT DOCUMENTS 5,148,302 A   9/1992  Nagano et al.
5,455,693 A   10/1995 Wreede et al.
(Continued)

FOREIGN PATENT DOCUMENTS

CA   2962899 A1   4/2016
EP   0981065 A2   2/2000
(Continued)

OTHER PUBLICATIONS

International Search Report and Written Opinion for International Patent Application No. PCT/US2017/066181 dated Mar. 1, 2018.
(Continued)

*Primary Examiner* — Andrew Jordan
(74) *Attorney, Agent, or Firm* — Thomas B. Ryan, Patent Agent; Jacob D. Merrill, Esq.; Harter Secrest & Emery LLP

(57) ABSTRACT

An imaging light guide for conveying a virtual image has a waveguide that conveys image-bearing light, formed as a flat plate having a front and a back surface and having an in-coupling diffractive optic on the front surface with a first grating vector diffracting an image-bearing light beam into the waveguide and directing diffracted light. An out-coupling diffractive optic is formed on the front or back surface as a diffractive array and with a first subset of diffractive elements, each having a second grating vector k2 offset from the first grating vector by about +60 degrees and a second subset of diffractive elements, each having a third grating vector k3 offset from the first grating vector by about −60 degrees. Each diffractive element of the first subset is
(Continued)

immediately adjacent to at least one diffractive element of the second subset and the diffractive elements are mutually non-overlapping.

13 Claims, 17 Drawing Sheets

(52) U.S. Cl.
CPC .. *G02B 27/0172* (2013.01); *G02B 2027/0174* (2013.01); *G02B 2027/0178* (2013.01)

(58) Field of Classification Search
CPC .... G02B 2027/0178; G02B 2027/0174; G02B 2027/0138; G02B 2027/0125
See application file for complete search history.

(56) References Cited

U.S. PATENT DOCUMENTS

| | | | | |
|---|---|---|---|---|
| 5,469,277 | A * | 11/1995 | Kavehrad | G02B 6/2848 359/15 |
| 6,324,004 | B1 * | 11/2001 | Staub | G02B 5/1842 283/86 |
| 6,580,529 | B1 | 6/2003 | Amitai et al. | |
| 7,333,692 | B1 | 2/2008 | Mossberg et al. | |
| 7,453,612 | B2 * | 11/2008 | Mukawa | G02B 5/32 359/15 |
| 8,049,966 | B2 * | 11/2011 | Chann | H01S 5/4062 359/624 |
| 8,160,411 | B2 | 4/2012 | Levola et al. | |
| 8,493,662 | B2 | 7/2013 | Noui | |
| 8,531,772 | B2 | 9/2013 | Chann et al. | |
| 8,548,290 | B2 * | 10/2013 | Travers | G02B 27/0081 385/37 |
| 9,341,846 | B2 | 5/2016 | Popovich et al. | |
| 9,400,395 | B2 | 7/2016 | Travers | |
| 9,646,235 | B2 * | 5/2017 | Pranov | B29C 45/374 |
| 9,746,785 | B2 * | 8/2017 | Van Der Schaar | G03F 7/70566 |
| 10,007,117 | B2 * | 6/2018 | Schultz | G02B 27/0081 |
| 10,156,725 | B2 * | 12/2018 | TeKolste | G02B 27/0172 |
| 10,261,318 | B2 * | 4/2019 | TeKolste | G02B 27/0172 |
| 10,359,632 | B2 * | 7/2019 | Schultz | G02B 6/0038 |
| 2001/0002165 | A1 | 5/2001 | Shinohara | |
| 2002/0176463 | A1 | 11/2002 | Bullington et al. | |
| 2003/0057417 | A1 | 3/2003 | Lee | |
| 2004/0062502 | A1 | 4/2004 | Levola | |
| 2004/0109208 | A1 | 6/2004 | Amanai et al. | |
| 2004/0246874 | A1 | 12/2004 | Takagi et al. | |
| 2004/0252377 | A1 | 12/2004 | Urey | |
| 2006/0132914 | A1 | 6/2006 | Weiss | |
| 2006/0228073 | A1 | 10/2006 | Mukawa | |
| 2006/0291021 | A1 * | 12/2006 | Mukawa | G02B 5/32 359/15 |
| 2008/0138013 | A1 | 6/2008 | Parriaux | |
| 2009/0040580 | A1 | 2/2009 | Mukawa | |
| 2010/0110556 | A1 * | 5/2010 | Chann | H01S 5/4062 359/619 |
| 2010/0214659 | A1 | 8/2010 | Levola | |
| 2010/0284085 | A1 | 11/2010 | Laakkonen | |
| 2011/0204484 | A1 * | 8/2011 | Van Der Schaar | G03F 7/70566 257/618 |
| 2012/0002272 | A1 * | 1/2012 | Chann | H01S 5/4062 359/349 |
| 2013/0051730 | A1 * | 2/2013 | Travers | G02B 27/01 385/37 |
| 2013/0201094 | A1 | 8/2013 | Travis et al. | |
| 2014/0300966 | A1 * | 10/2014 | Travers | G02B 6/0035 359/558 |
| 2015/0086163 | A1 | 3/2015 | Valera et al. | |
| 2016/0070999 | A1 | 3/2016 | Pranov et al. | |
| 2016/0116739 | A1 * | 4/2016 | TeKolste | G02B 27/0172 385/36 |
| 2017/0038593 | A1 * | 2/2017 | Travers | G02B 27/01 |
| 2017/0075119 | A1 | 3/2017 | Schultz et al. | |
| 2017/0322419 | A1 * | 11/2017 | TeKolste | G02B 27/0172 |
| 2017/0371160 | A1 * | 12/2017 | Schultz | G02B 6/0016 |
| 2019/0121142 | A1 * | 4/2019 | TeKolste | G02B 27/0172 |
| 2019/0243141 | A1 * | 8/2019 | TeKolste | G02B 6/0025 |
| 2019/0243142 | A1 * | 8/2019 | TeKolste | G02B 6/0025 |
| 2019/0361242 | A1 * | 11/2019 | Schultz | G02B 6/0038 |
| 2020/0064630 | A1 * | 2/2020 | Pfeiffer | G02B 6/2931 |
| 2020/0088932 | A1 * | 3/2020 | Schultz | G02B 27/0172 |
| 2020/0096771 | A1 * | 3/2020 | Oh | G02B 5/08 |
| 2020/0209630 | A1 * | 7/2020 | Schultz | G02B 27/4205 |

FOREIGN PATENT DOCUMENTS

| | | |
|---|---|---|
| EP | 1016817 B1 | 10/2003 |
| EP | 2241926 A1 | 4/2009 |
| EP | 2748659 B1 | 5/2016 |
| WO | 9952002 A1 | 10/1999 |
| WO | 2004005556 A1 | 1/2004 |
| WO | 2006035811 A1 | 4/2006 |
| WO | 2006064334 A1 | 6/2006 |
| WO | 2007042852 A1 | 4/2007 |
| WO | 2013180737 A1 | 12/2013 |
| WO | 2016/011367 A2 | 1/2016 |
| WO | 2016011367 A2 | 1/2016 |
| WO | 2016/020643 A1 | 2/2016 |
| WO | 2016/112130 A1 | 7/2016 |

OTHER PUBLICATIONS

John D. Joannopoulos et al., Photonic Crystals: Molding the Flow of Light, Ch. 5, p. 66, (2d ed. 2008).
Lin et al., Demonstration of Highly Efficient Waveguiding in a Photonic Crystal Slab at the 1.5um Wavelength, Optics Letters, vol. 25 (Sep. 1, 2000).
Tapani Levola, Diffractive Optics for Virtual Reality Displays, Journal of the SID, 1415, pp. 467-475, 2006.
Joannopoulos, John D. et al., Photonic Crystals: Molding the Flow of Light, 2d ed., 2008, Ch. 5 pp. 66-67, Princeton University Press, United States (http://ab-initio.mit.edu/book/photonic-crystals-book.pdf).
Lin, S. Y. et al., Demonstration of Highly Efficient Waveguiding in a Photonic Crystal Slab at the 1.5um Wavelength, Optics Letters, vol. 25., No. 17, pp. 1297-1299, Sep. 1, 2000.
Levola, Tapani, Diffractive optics for virtual reality displays, Journal of the SID, 14/5, pp. 467-475, 2006.

* cited by examiner

| Direction of incidence | Response at +0° grating (vector k) | Response at +60° grating (vector k2) | Response at -60° grating (vector k3) |
|---|---|---|---|
| 0° → | Output | Turn to -60° | Turn to +60° |
| +60° ↗ | Turn to +120° | Turn to 0° | Output |
| -60° ↘ | Turn to -120° | Output | Turn to 0° |
| +120° ↖ | Turn to +60° | Turn to 180° | Output |
| -120° ↙ | Turn to -60° | Output | Turn to 180° |
| 180° ← | Output | Turn to +120° | Turn to -120° |

FIG. 8C

IMAGING LIGHT GUIDE WITH GRATING-EXPANDED LIGHT DISTRIBUTION

TECHNICAL FIELD

This invention generally relates to electronic displays and more particularly relates to displays that use a planar imaging light guide to provide image-bearing light to a viewer.

BACKGROUND OF THE INVENTION

Head-Mounted Displays (HMDs) are being developed for a range of diverse uses, including military, commercial, industrial, fire-fighting, and entertainment applications. For many of these applications, there is particular value in forming a virtual image that can be visually superimposed over the real-world image that lies in the field of view of the HMD user. Optical imaging light guides convey image-bearing light to a viewer in a narrow space for directing the virtual image to the viewer's pupil and enabling this superposition function.

In such conventional imaging light guides, collimated, relatively angularly encoded light beams from an image source are coupled into a planar waveguide by an input coupling such as an in-coupling diffractive optic, which can be mounted or formed on a surface of the planar waveguide or buried within the waveguide. Such diffractive optics can be formed as diffraction gratings, holographic optical elements or in other known ways. For example, the diffraction grating can be formed by surface relief. After propagating along the waveguide, the diffracted light can be directed back out of the waveguide by a similar output grating, which can be arranged to provide pupil expansion along one dimension of the virtual image. In addition, a turning grating can be positioned along the waveguide between the input and output gratings to provide pupil expansion in an orthogonal dimension of the virtual image. The image-bearing light output from the waveguide provides an expanded eyebox for the viewer.

Although conventional imaging light guide arrangements have provided significant reduction in bulk, weight, and overall cost of near-eye display optics, there is still room for improvement. The size of the eyebox is constrained, forcing HMD designs to limit tolerances for movement and device placement. Light can often be unevenly distributed over the visual field, leading to hot spots toward the center, with reduced light levels along the field periphery. Manufacturing costs and complexity continue to be obstacles to making HMD apparatus more affordable and easier to use.

Thus, it can be appreciated that there is a need for improved designs that provide the pupil expansion capabilities of the optical imaging light guide with improved overall light distribution and performance.

SUMMARY OF INVENTION

It is an object of the present disclosure to advance the art of virtual image presentation when using compact head-mounted devices and similar imaging apparatus. Advantageously, embodiments of the present disclosure provide an optical imaging light guide having expanded light mixing and distribution in a compact package.

These and other aspects, objects, features and advantages of the present invention will be more clearly understood and appreciated from a review of the following detailed description of the preferred embodiments and appended claims, and by reference to the accompanying drawings.

According to an aspect of the present disclosure, there is provided an imaging light guide for conveying a virtual image. A waveguide defines a light path that conveys image-bearing light. The waveguide can be formed as a flat plate having a front surface and a back surface that extend in parallel. Along the light path, an in-coupling diffractive optic can be formed on the front surface having a first grating vector. The in-coupling diffractive optic diffracts an image-bearing light beam into the waveguide and directs the diffracted light along the light path according to the first grating vector. An out-coupling diffractive optic can also be formed on the front surface in a position along the light path that is spaced apart from the in-coupling diffractive optic. The out-coupling diffractive optic can be arranged as a diffractive array including a first subset of diffractive elements, each element having a second grating vector k2 that is offset from the first grating vector by about +60 degrees and a second subset of diffractive elements, each element having a third grating vector k3 that is offset from the first grating vector by about −60 degrees. Each diffractive element of the first subset is preferably immediately adjacent to at least one diffractive element of the second subset, and the diffractive elements of the first and second subsets are preferably mutually non-overlapping.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

FIG. 8C is a table that summarizes light handling for the patterned out-coupling diffractive optic of FIG. 8A.

DETAILED DESCRIPTION OF THE INVENTION

Figure 1:
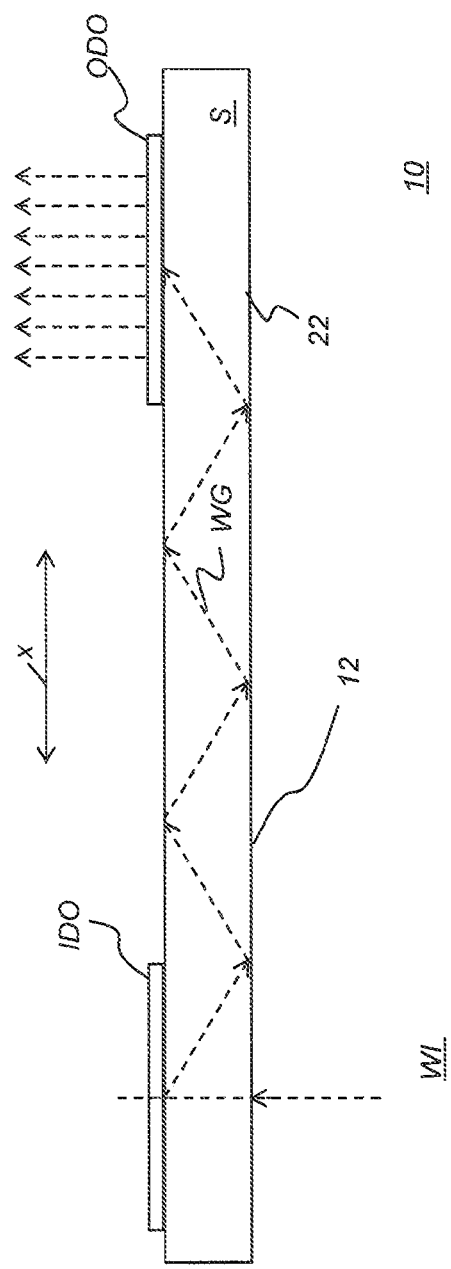
FIG. 1 is a schematic diagram that shows a simplified cross-sectional view of a diffractive beam expander.

The present description is directed in particular to elements forming part of, or cooperating more directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise.

In the context of the present disclosure, the terms "viewer", "operator", "observer", and "user" are considered to be equivalent and refer to the person who wears and views images using the HMD viewing device.

As used herein, the term "energizable" relates to a device or set of components that perform an indicated function upon receiving power and, optionally, upon receiving an enabling signal.

The term "actuable" has its conventional meaning, relating to a device or component that is capable of effecting an action in response to a stimulus, such as in response to an electrical signal, for example.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the term "oblique" means at an angle that is not an integer multiple of 90 degrees. Two lines, linear structures, or planes, for example, are considered to be oblique with respect to each other if they diverge from or converge toward each other at an angle that is at least about 5 degrees or more away from parallel, or at least about 5 degrees or more away from orthogonal.

In the context of the present disclosure, the terms "wavelength band" and "wavelength range" are equivalent and have their standard connotation as used by those skilled in the art of color imaging and refer to a continuous range of light wavelengths that are used to represent polychromatic images. Different wavelength bands are directed through different color channels, such as to provide red, green, and blue primary colors in conventional color imaging applications.

As an alternative to real image projection, an optical system can produce a virtual image display. In contrast to methods for forming a real image, a virtual image is not formed on a display surface. That is, if a display surface were positioned at the perceived location of a virtual image, no image would be formed on that surface. Virtual image display has a number of inherent advantages for augmented reality presentation. For example, the apparent size of a virtual image is not limited by the size or location of a display surface. Additionally, the source object for a virtual image may be small; a magnifying glass, as a simple example, provides a virtual image of its object. In comparison with systems that project a real image, a more realistic viewing experience can be provided by forming a virtual image that appears to be some distance away. Providing a virtual image also obviates any need to compensate for screen artifacts, as may be necessary when projecting a real image.

In the context of the present disclosure, the term "coupled" is intended to indicate a physical association, connection, relation, or linking, between two or more components, such that the disposition of one component affects the spatial disposition of a component to which it is coupled. For mechanical coupling, two components need not be in direct contact, but can be linked through one or more intermediary components. A component for optical coupling allows light energy to be input to, or output from, an optical apparatus. The terms "beam expander" and "pupil expander" are considered to be synonymous, used interchangeably herein.

FIG. 1 is a schematic diagram that shows a simplified cross-sectional view of one conventional configuration of a monocular type diffractive beam expander or exit pupil expander 10 formed as an imaging light guide 22 comprising an input coupling element such as an in-coupling diffractive optic IDO, and an output coupling element, such as an out-coupling diffractive optic ODO arranged on a transparent and planar waveguide or imaging light guide substrate S, alternately termed pupil expander substrate S. In this example, in-coupling diffractive optic IDO is shown as a reflective type diffraction grating; however, in-coupling diffractive optic IDO could alternately be a transmissive diffraction grating, volume hologram or other holographic diffraction element, or other type of optical component that provides diffraction for the incoming, image-bearing light, arranged on a lower surface 12 of the pupil expander substrate S, where the in-coming light beam WI first interacts with the pupil expander substrate S.

When used as a part of a virtual display system, in-coupling diffractive optic IDO couples the in-coming image-bearing light beam WI from an imager, via suitable front end optics (not shown), into the substrate S of imaging light guide 22. The input light is diffracted by in-coupling diffractive optic IDO. A portion of the first order diffracted light forms an imaging light guided light wave WG that propagates along the substrate S, moving toward the right in the FIG. 1 system, toward out-coupling diffractive optic ODO. Between gratings or other types of diffractive elements, light is channeled or directed through the imaging light guide by Total Internal Reflection (TIR). Out-coupling diffraction element ODO contributes to beam expansion, along the x-axis in the view of FIG. 1, and couples the light that it receives through substrate S, directing the light outwards, towards the observer. Intermediate grating TG is termed a "turning grating" because of its function in the optical path, redirecting an input beam from within the waveguide substrate that is incident on the grating, according to its grating vector.

Figure 2:
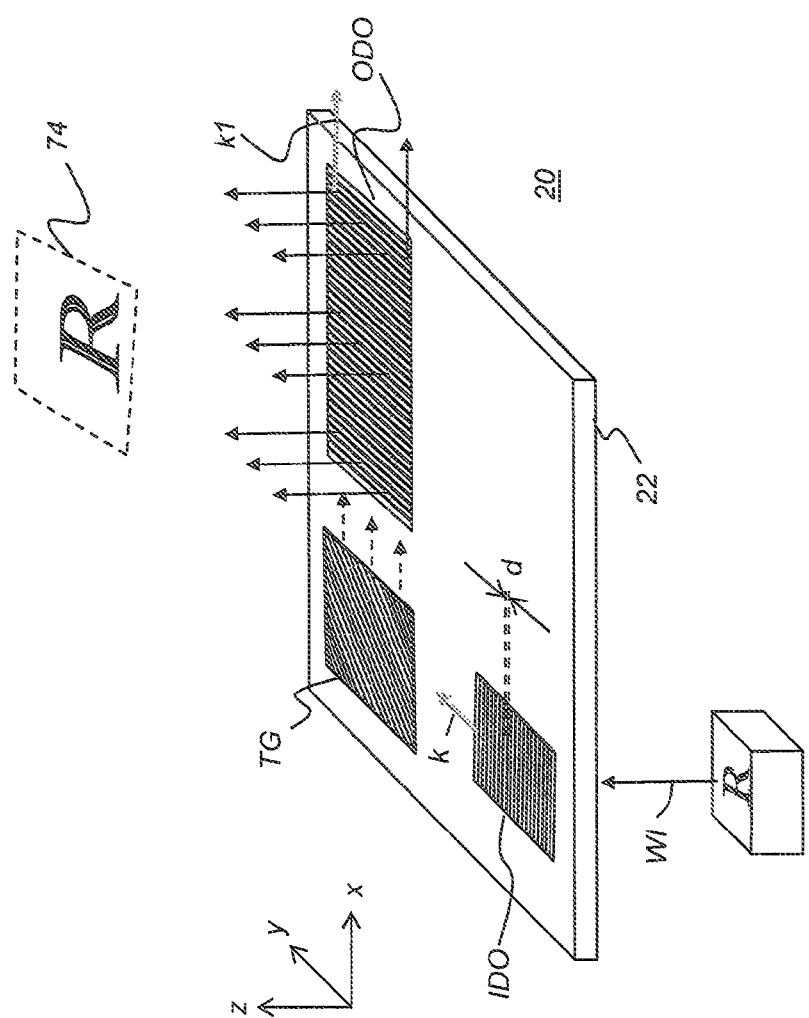
FIG. 2 is a perspective view that shows a diffractive beam expander with a turning grating.

The perspective view of FIG. 2 shows a conventional beam expander 20 that is configured as an imaging light guide and that provides beam expansion along x- and y-axes of the intended image using an intermediate turning grating TG to redirect the light output (first diffracted mode) from in-coupling diffractive optic IDO to out-coupling diffractive optic ODO. In the FIG. 2 device, in-coupling diffractive optic IDO containing periodic rulings with a period d receives incoming input optical beam WI representing one of a plurality of pixel generated by an image source 16. A full range of angularly encoded beams for producing a virtual image can be generated by a real display together with focusing optics, by a beam scanner for more directly setting the angles of the beams, or by a combination such as a one-dimensional real display used with a scanner. Beam expander 20 provides an expanded output beam from out-coupling diffractive optic ODO by using intermediate grating TG. Intermediate grating TG provides beam expansion in the y-axis direction and has an angular orientation of diffractive optics and a spacing geometry determined by spacing period d periodicity and the difference in angle of the diffraction features between diffractive optic IDO and diffractive optic ODO.

In considering a light guide design used for imaging it should be noted that image-bearing light traveling within a imaging light guide such as a conventional waveguide is effectively encoded by the in-coupling optics, whether the in-coupling mechanism uses gratings, holograms, prisms, mirrors, or some other mechanism. Any reflection, refraction, and/or diffraction of light that takes place at the input must be correspondingly decoded by the output in order to re-form the virtual image that is presented to the viewer. Out-coupling diffractive optic ODO directs the image-bearing light to an eyebox, shown schematically as eyebox 74 in FIG. 2. The letter "R" represents the orientation of the virtual image that is formed so that it is visible to the viewer whose eyes are in proximity to eyebox 74.

A turning grating, placed at an intermediate position between the input and output diffraction elements, is typically chosen so that it does not induce any change on the encoded light. If, for example, the pitch of the turning grating matches the input and output diffraction elements, it is oriented at 60 degrees to the input and output diffraction elements in such a way that the encoded ray bundles are turned 120 degrees by one of the 1st reflection orders of the diffraction elements. This diffraction only acts on the vector component of the incoming rays that are parallel to the grating vector of the turning grating. This is evident by the fact that such turning gratings redirect ray bundles within the guide substrate, but do not change the encoded angular information of the virtual image. The resultant virtual image in such a designed system is not rotated. Further, if such a system did introduce any rotation to the virtual image, it would do so non-uniformly across different field angles and wavelengths of light, thus causing unwanted distortions or chromatic aberrations in the resultant virtual image.

The use of turning grating TG provides an inherent geometrical accuracy to the design of beam expander 20 so that the input beam and output beam are symmetrically oriented with respect to each other. With proper grating TG spacing and orientation, grating vectors k direct the light from the in-coupling diffractive optic IDO to the out-coupling diffractive optic ODO with grating vector k1. Grating vectors extend in a direction that is normal to the grooves of the diffraction grating and with a magnitude inverse to the pitch (distance between grooves). Image symmetry is shown for an image of the letter 'R' in FIG. 2. It should be noted that the image that is formed for the imaging light guide viewer is a virtual image, focused at infinity, but with the relative orientation of output image content to input image content as represented in FIG. 2. A change in the rotation about the z axis or angular orientation of incoming light wave WI with respect to the x-y plane causes a corresponding symmetric change in rotation or angular orientation of outgoing light from out-coupling diffractive optic (ODO). From the aspect of image orientation, turning grating TG simply acts as a type of optical relay, providing magnification along one axis of the image that is input at in-coupling diffractive optic IDO to out-coupling diffractive optic (ODO). Turning grating TG is typically a slanted or square grating or, alternately, can be a blazed grating.

Beam expansion in two different dimensions is provided when using the arrangement of FIG. 2. Turning grating TG expands the diffracted beam from in-coupling diffractive optic IDO in the y direction as shown. Out-coupling diffractive optic ODO further expands the diffracted beam in the x direction, orthogonal to the y direction as shown.

The conventional imaging light guide beam expander 20 that is shown in FIGS. 1 and 2 is used in a number of existing head-mounted device (HMD) designs for providing image content to a viewer. This type of beam expander is particularly well-suited to augmented reality applications in which image content can be superimposed on a real-world view as seen through the transparent imaging light guide.

Figure 3:
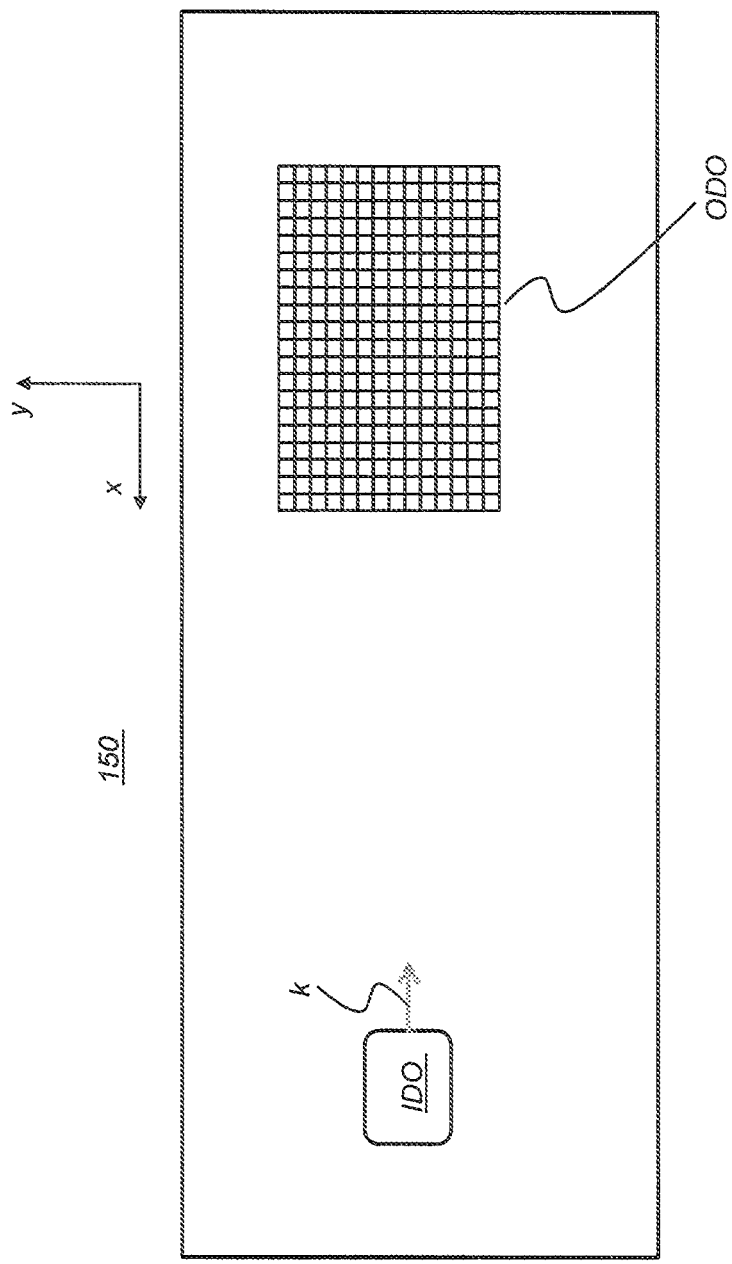
FIG. 3 is a plan view that shows a waveguide having an in-coupling diffractive optic and out-coupling diffractive optic, both formed on the same surface of the waveguide.

An embodiment of the present disclosure provides improved waveguide performance and eliminates the need for turning grating TG in the light path by using a diffractive array that performs the dual function of turning and expanding the light beam in both x and y directions and providing the expanded output light. Referring to FIG. 3, there is shown a waveguide as beam expander 150 having in-coupling diffractive optic IDO and out-coupling diffractive optic ODO, both IDO and ODO that can be formed on the same surface of waveguide 150. Alternately, IDO and ODO can be formed on the different surfaces of waveguide 150. In-coupling diffractive optic IDO has the grating vector k extending in the x direction, as shown. Out-coupling diffractive optic ODO has multiple grating vectors that are not parallel to grating vector k, as shown subsequently.

Figure 4:
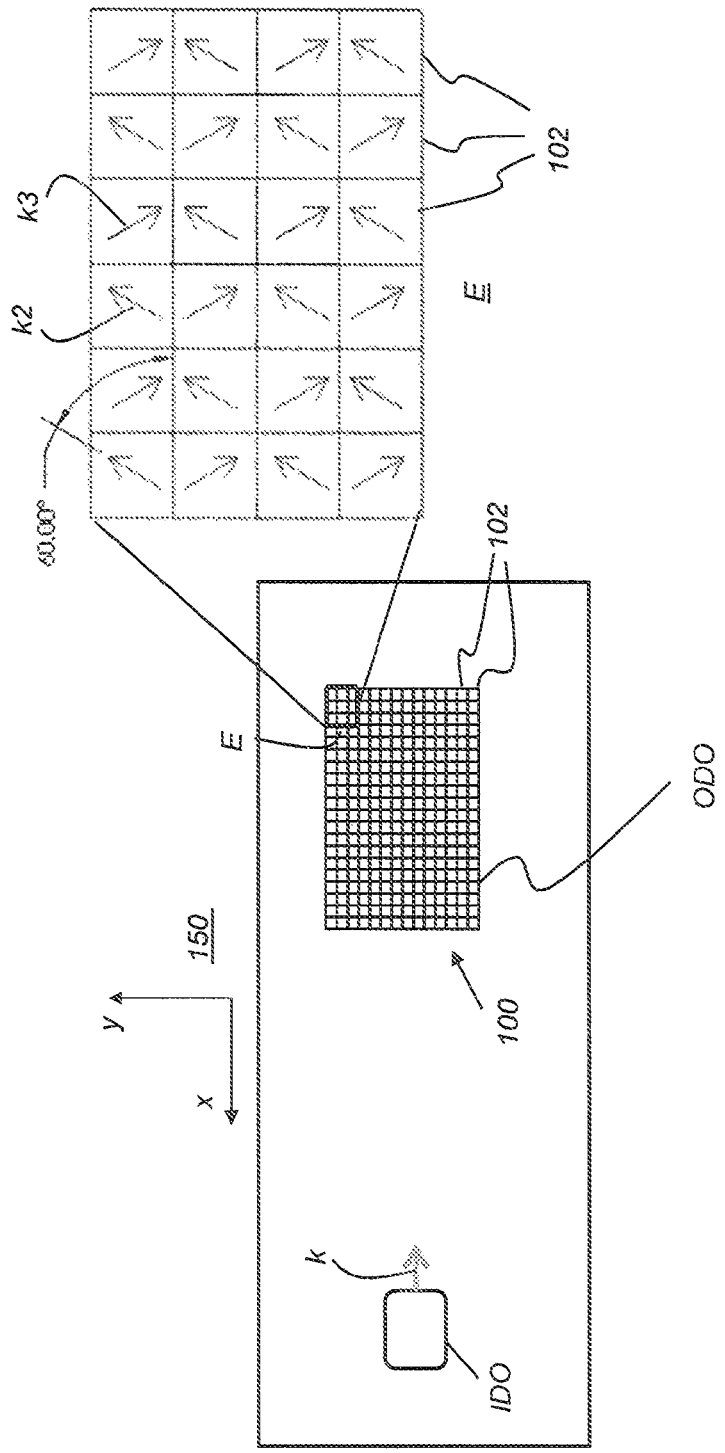
FIG. 4 is a plan view showing an enlarged portion of the out-coupling diffractive optic with a pattern of alternating grating vectors.

The plan view of FIG. 4 shows, an arrangement of out-coupling diffractive optic ODO as a diffractive array 100. Array 100 has multiple component diffractive optical elements or optics 102. In a row of the array 100, sequential diffractive optical elements 102 have alternating grating vectors k2 and k3. The alternating grating vector arrangement is schematically shown for a portion of array 100 in an enlarged view E. Grating vectors k2 are offset from input grating vector k and from axis x by +60 degrees (alternately, offset from axis y by −30 degrees). Grating vectors k3 are offset from input grating vector k and axis x by −60 degrees.

Diffractive array 100, used in the light path as out-coupling diffractive optic in FIG. 4 and subsequent embodiments, can be considered structurally formed as the union of disjoint, mutually non-overlapping subsets of diffractive elements or optics formed on a single surface. Considered in terms of set theory, this union of subsets forms a "partition". There is a unique grating vector corresponding to each subset of the partition and the subsets are distinguished from each other according to the grating vector direction. That is, all of the diffractive elements in each subset have a common grating vector. In the spatial arrangement of diffractive elements 102, elements of at least two subsets alternate with each other, so that each element from the subset with grating vector k2 is immediately adjacent to one or more neighboring elements from the other subset with grating vector k3. More than two subsets of immediately adjacent elements can be used to constitute the partition of diffractive array 100; each subset has a grating vector that extends in a different direction from the corresponding grating vector for any other subset.

Figure 5C:
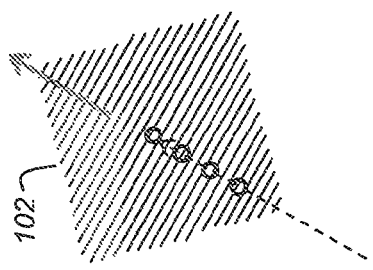
FIGS. 5A, 5B, 5C, 5D, and 5E show light behavior within the patterned out-coupling diffractive optic of FIG. 4.
Figure 5A:
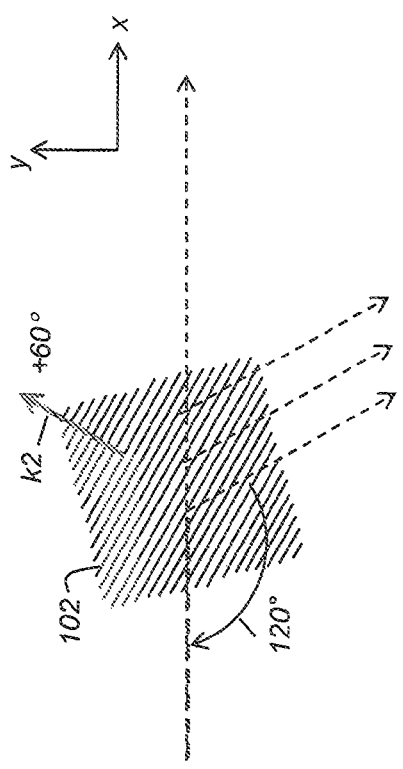

The schematic views of FIGS. 5A through 5E show how this arrangement using alternating grating vectors operates at individual diffractive elements 102 to distribute and output light for forming a virtual image. FIG. 5A shows how light incident from IDO, traveling toward the left in the depiction shown, interacts over a portion of diffractive element 102 that is formed having grating vector k2. Some portion of the incident light is diffracted at optic 102 and deflected 120 degrees from the original path of light from IDO. A percentage of this light is diffracted and redirected, to other portions of array 100, at each of several points along the diffraction grating. Another portion of this light is not diffracted, but instead travels through the diffractive optical element 102 and to the next optical element 102 in sequence.

Figure 5B:
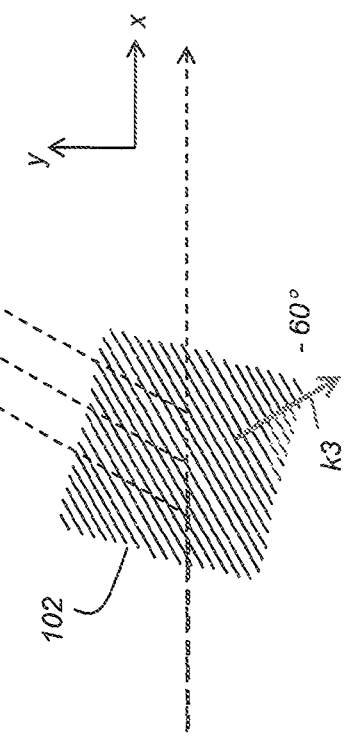

FIG. 5B shows a similar path to that described for FIG. 5A, but in the inverse direction. Incident light from IDO that is conveyed to diffractive element 102 having grating vector k3 can take either of the angular paths shown. Some portion of the incident light is diffracted at optical element 102 and deflected −120 degrees from the original path of light from IDO. A percentage of this light is diffracted and redirected, to other portions of array 100, at each of several points along the diffraction grating. Another portion of this light is not diffracted, but instead travels through the diffractive element 102 and to the next element 102 in sequence.

FIG. 5C shows what happens when light is incident at an angle that is substantially orthogonal to the gratings of diffractive element 102. At this angle, the light exits from diffractive element 102, with some portion of the light directed outward at each interaction with the diffractive structures.

Figure 5D:
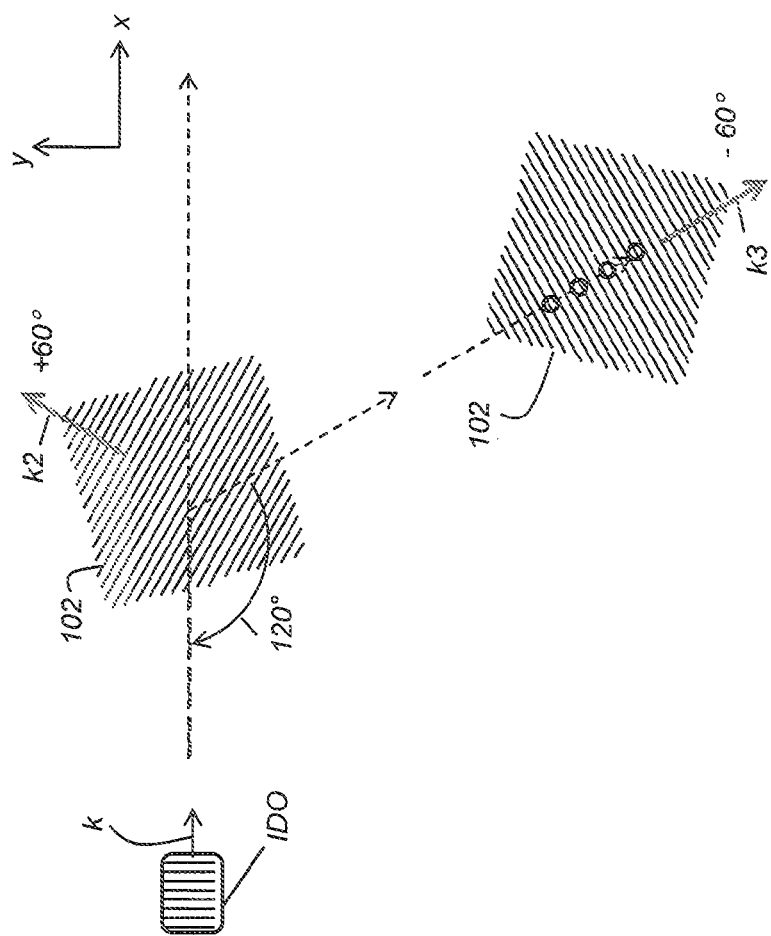

FIG. 5D shows one type of interaction that causes light to be output from array 100. Some of the light diffracted from element 102 having grating vector k2 can be incident on another optical element 102 further into the array 100 and having grating vector k3. The condition shown in FIG. 5C is satisfied, with light incidence parallel to the grating vector. This light is then output (that is, output from the page in the view of FIG. 5D).

Figure 5E:
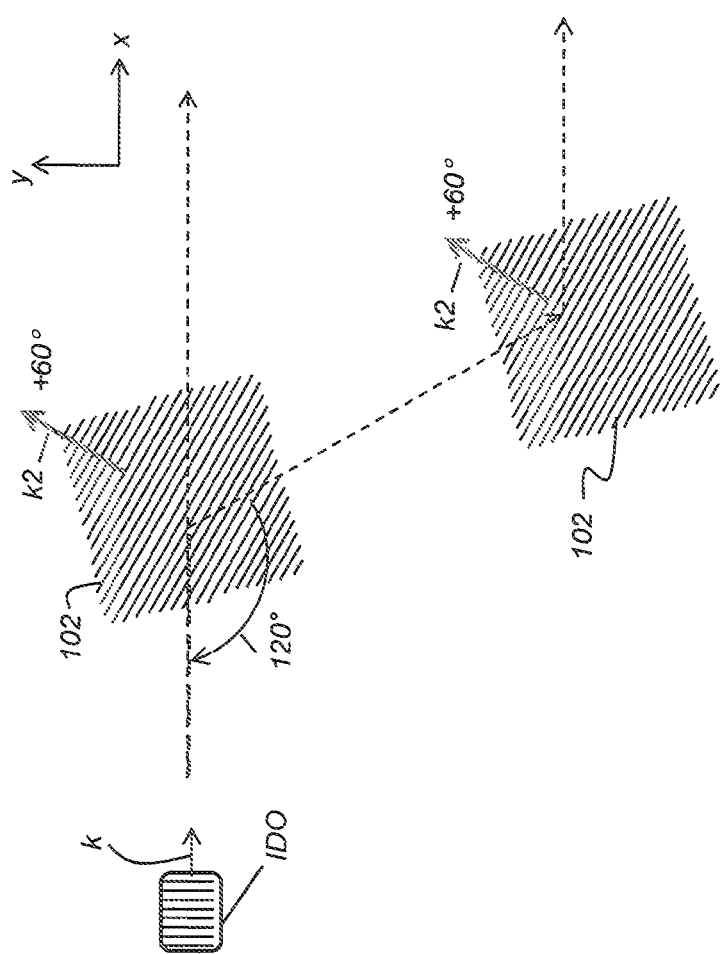

FIG. 5E shows a different interaction that can occur along the light path within array 100. Here, some of the light diffracted from optical element 102 having grating vector k2 can be incident on another element 102 further into the array 100 and also having grating vector k2. The resulting output light is directed outward, parallel to the input light in the arrangement shown.

Figure 6:
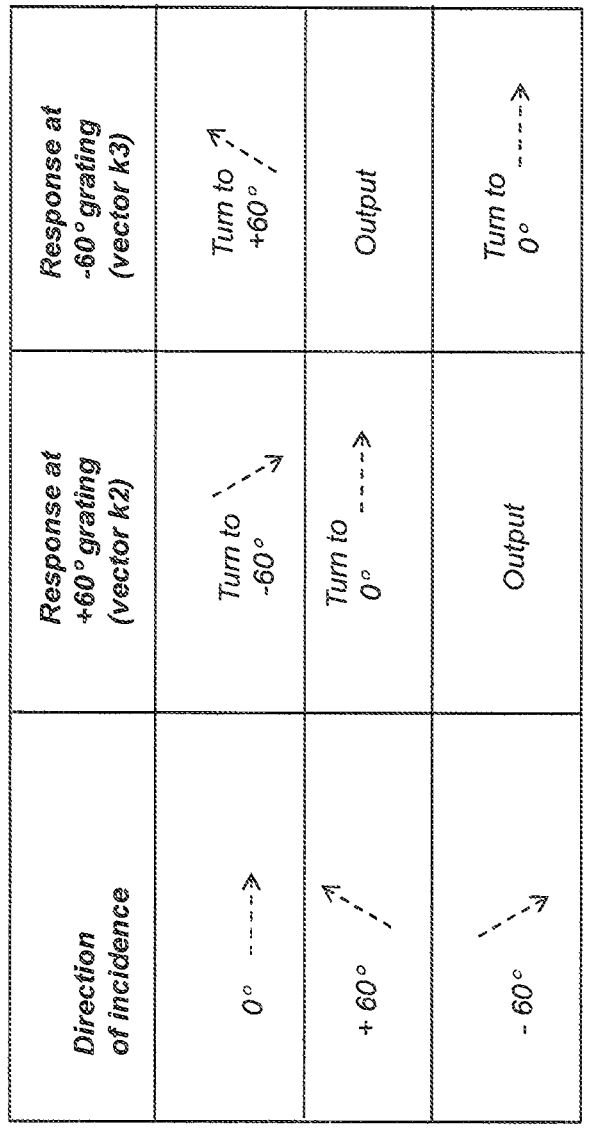
FIG. 6 is a table that summarizes light handling for the patterned out-coupling diffractive optic of FIG. 4.

FIG. 6 shows Table 1 that summarizes the predominant light response for each diffractive element 102 of a diffractive array 100. From the description related to FIGS. 5A-6, it can be seen that there are numerous potential paths for incident light within diffractive array 100, allowing the light to be spread along both x and y axis directions for providing an expanded output. It should be noted, for example, that not all of the light incident at a particular angle is redirected as shown in FIG. 6. Light that is not redirected at first contact with the grating can continue through the grating, to be redirected at any number of additional points along the grating. FIG. 6 shows the predominant path for light that will form the viewer image.

Figure 7B:
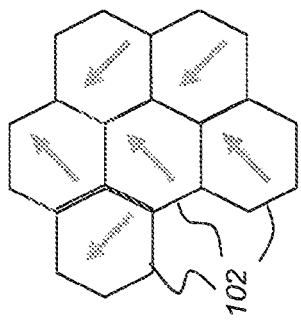
FIGS. 7A, 7B, and 7C show different geometrical arrangements of the subsets of diffractive elements that are combined to form a diffractive array according to embodiments of the present disclosure.
Figure 7A:
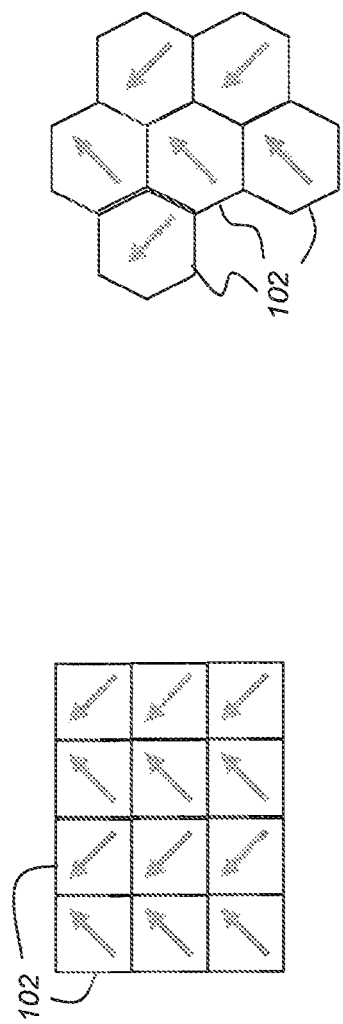
Figure 7C:
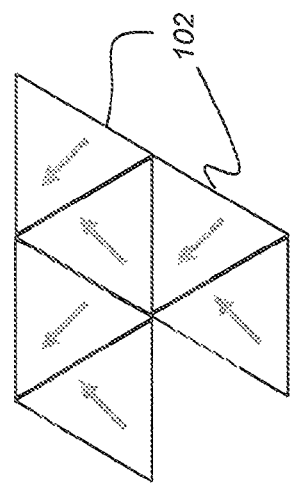

There are a number of shape arrangements for diffractive elements 102, depending on factors such as needed performance and manufacturability. The embodiment of FIG. 7A shows an enlarged portion of a checkerboard configuration, using rectangular elements 102 arranged with grating vectors k2, k3 alternating along each row and along each column of the array 100. FIG. 7B shows an enlarged portion of an arrangement using hexagons. FIG. 7C shows an enlarged portion of an arrangement using triangles. For each of these arrangements, the diffractive elements 102 are of either a first subset having a grating vector that is offset from the grating vector of the IDO by about +60 degrees (that is, offset by an angle within +60+/−3 degrees), or a second subset having a grating vector that is offset from the grating vector of the IDO by about −60 degrees (that is, offset by an angle within −60+/−3 degrees). Each diffractive element of the first (+60 degree) subset is immediately adjacent to at least one diffractive element of the second (−60 degree) subset. The diffractive elements of the first and second subsets are mutually non-overlapping.

Design parameters such as gratings depth and other features can be varied across the grating, such as to selectively output higher percentages of light toward extreme portions of out-coupling diffractive optic, for example.

In addition to shape modification, other changes to the basic model of FIG. 4 can include using, within diffractive array 100, some number of additional grating elements of a subset having grating vectors at angles other than +/−60 degrees. According to an embodiment of the present invention, some amount of randomization can be provided, including use of gratings at 0 degrees or at some other suitable angle, selectively interspersed in the light path extending along the array 100.

Figure 8A:
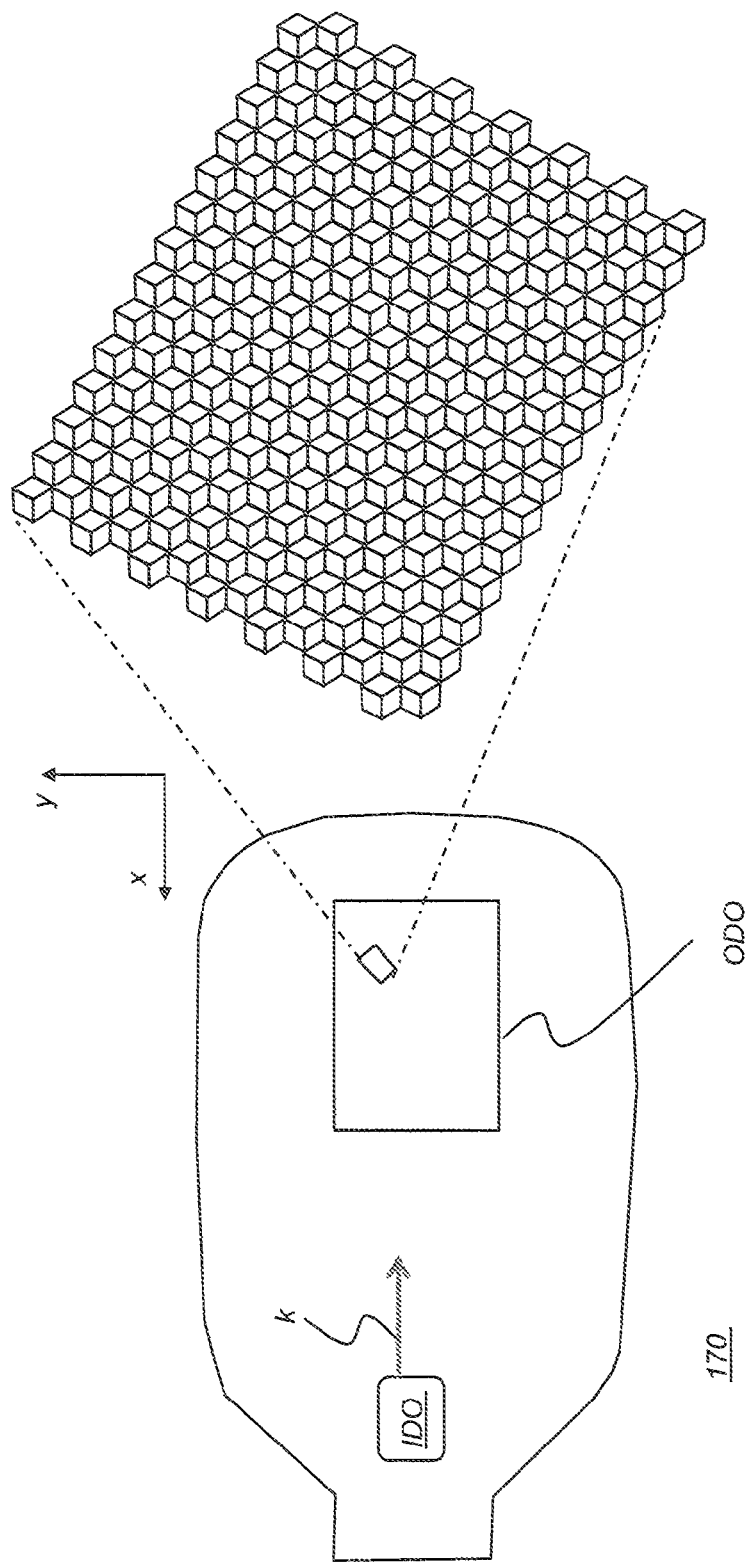
FIG. 8A shows a waveguide having in-coupling and out-coupling diffractive optics according to an alternate embodiment of the present disclosure.
Figure 8B:
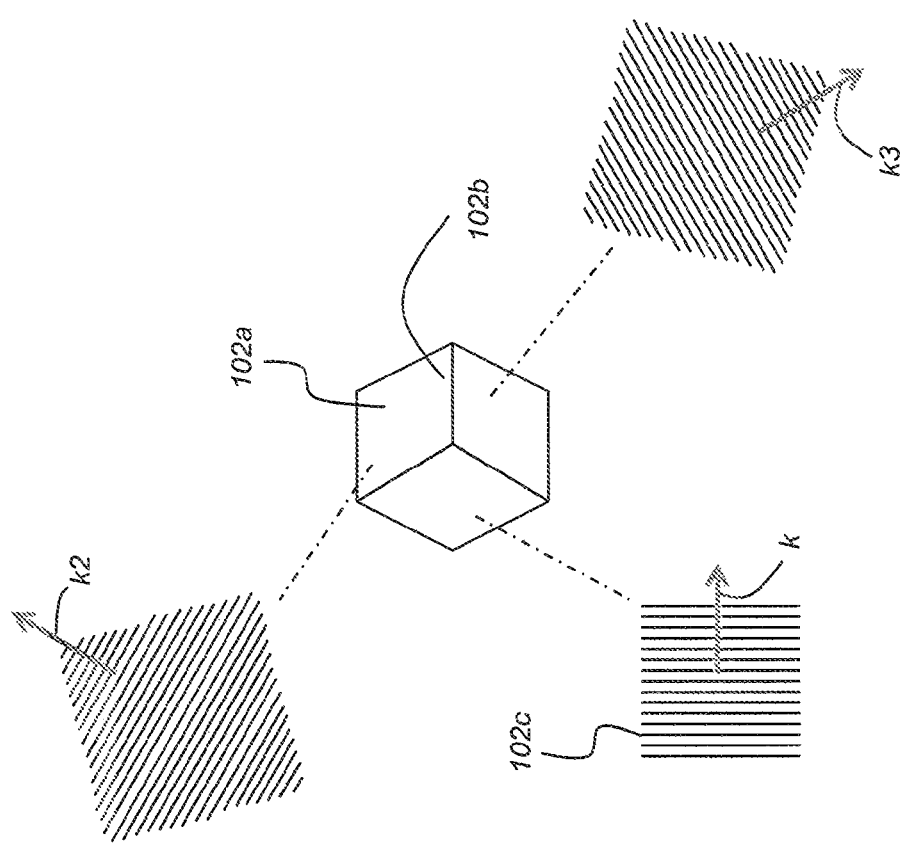
FIG. 8B is a schematic diagram that shows diffraction vectors for diffractive elements of the waveguide of FIG. 8A.

FIG. 8A and the enlarged schematic view of FIG. 8B show a beam expander 170 having in-coupling and out-coupling diffractive optics on the same side of the waveguide substrate according to an alternate embodiment of the present disclosure. In the configuration shown out-coupling diffractive optic ODO is formed of groupings of three diffractive elements, immediately adjacent to each other and having three corresponding grating vectors k, k2, and k3 as shown in FIG. 8B. The table in FIG. 8C shows light handling behavior for light traveling at different angles within beam expander 170. Grating vector k is about 60 degrees (60 degrees +/−3 degrees) from either grating vectors k2 and k3.

Advantageously, the embodiment shown in FIGS. 4 and 8A provides a waveguide that provides beam expansion without requiring turning gratings. Light distribution, however, can be improved by the use of additional distribution gratings, as shown in the exemplary embodiments of FIGS. 9A, 9B, and 10.

Figure 9A:
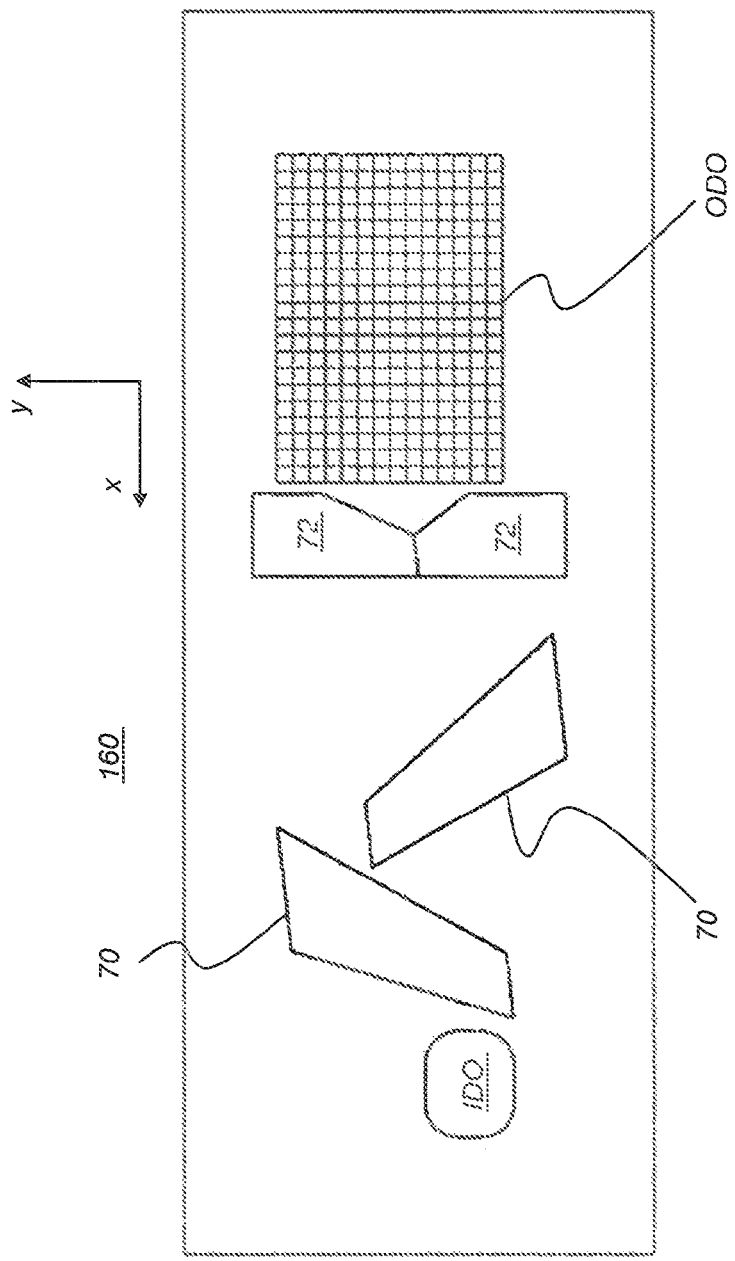
FIG. 9A is a plan view showing a beam expander having an arrangement of distribution gratings according to an embodiment of the present disclosure.
Figure 9B:
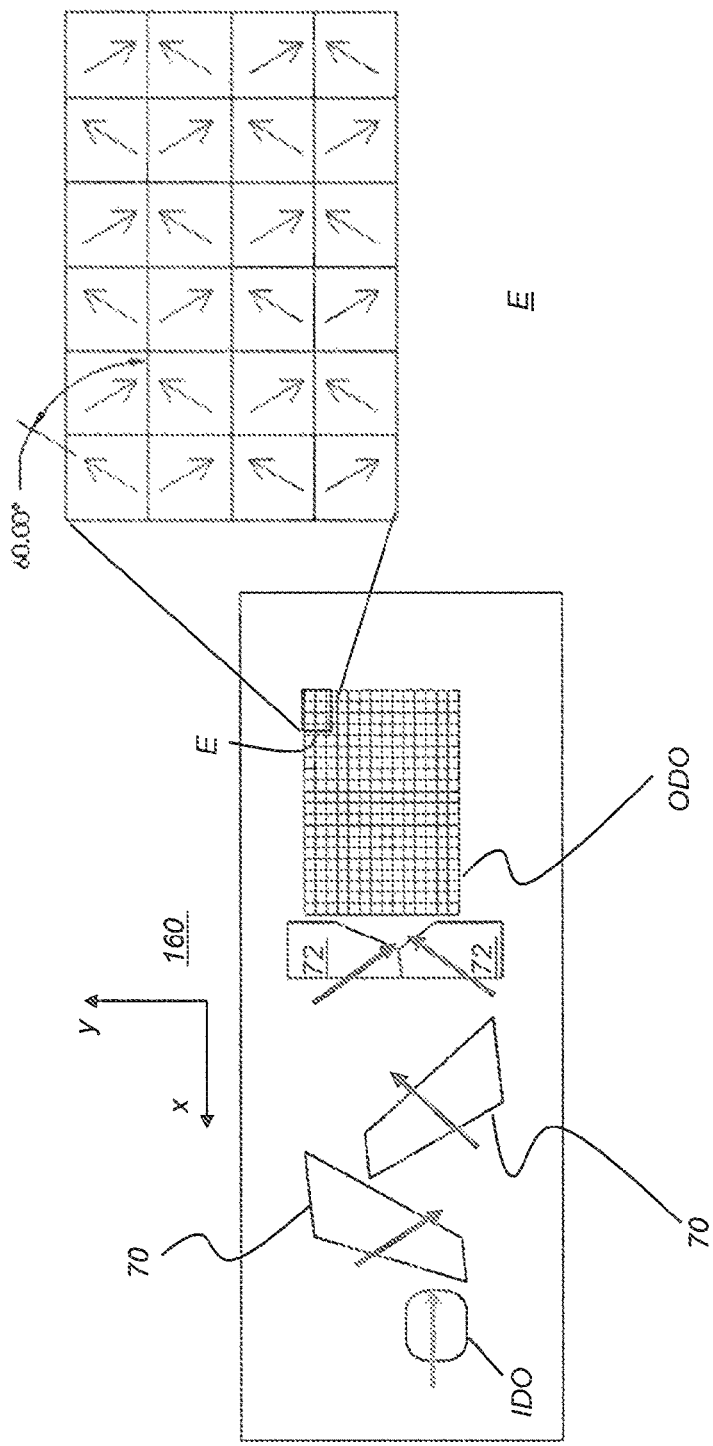
FIG. 9B is a plan view that shows the gratings vectors within a beam expander.

The plan view of FIG. 9A shows a waveguide that provides a light guide beam expander 160 using an arrangement of diffractive optics to form an expanded output beam from the waveguide. Light from in-coupling diffractive optic IDO is directed to first and second distribution gratings 70 for expansion with respect to the y dimension shown. The resulting light is then redirected into out-coupling diffractive optic ODO by paired distribution gratings 72. Out-coupling diffractive optic ODO uses diffractive array 100 as described previously. FIG. 9B shows representative grating vectors for the different diffractive components of beam expander 160.

Figure 10:
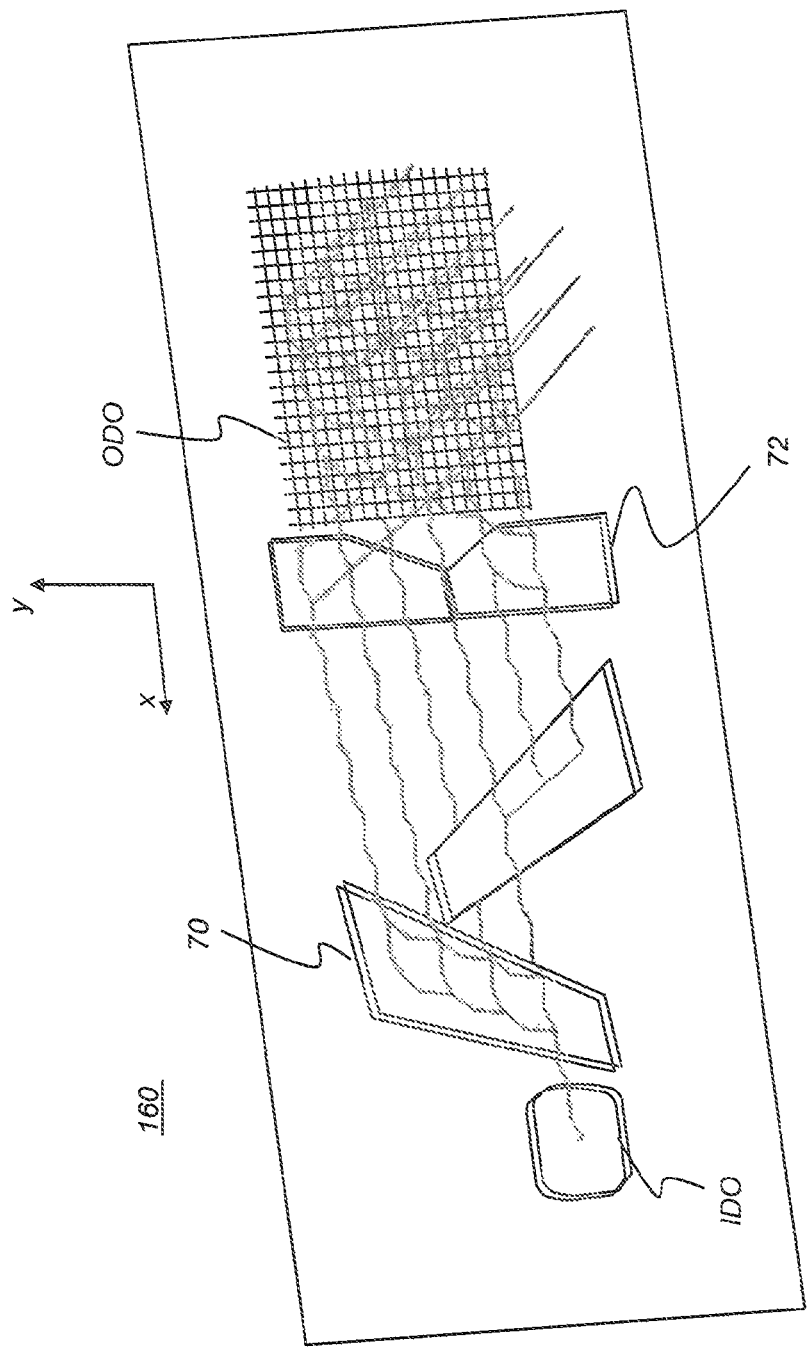
FIG. 10 is a perspective view that shows light paths within the beam expander of FIG. 8.

FIG. 10 shows a schematic view of light distribution paths that are defined for image-bearing light directed to in-coupling diffractive output IDO by light guide beam expander 160 of FIGS. 8 and 9. Light from in-coupling diffractive output IDO is expanded along the direction of the y-axis, with the light path directed through one or both distribution gratings 70. Light from each distribution grating 70 is then conveyed to the second pair of distribution gratings 72. Distribution gratings 72 redirect the light internally, but do this in order to spread the beam, redirecting the light in the direction of the output light path, toward out-coupling diffraction grating ODO. Out-coupling diffraction grating ODO then directs the light orthogonally out of beam expander 160 to form a viewer eyebox. Thus, the path of image-bearing light can be directed through at least two distribution gratings, wherein the distribution gratings are spaced apart from each other and expand the image-bearing light within the beam expander.

Pass-through light that proceeds along the light path from grating 70 to the subsequent distribution grating 72 is light that has been diffracted an even number of times. Expansion of the light with respect to the y axis is a result of odd-numbered diffractions {1, 3, 5, etc. . . . ]}.

Figure 11:
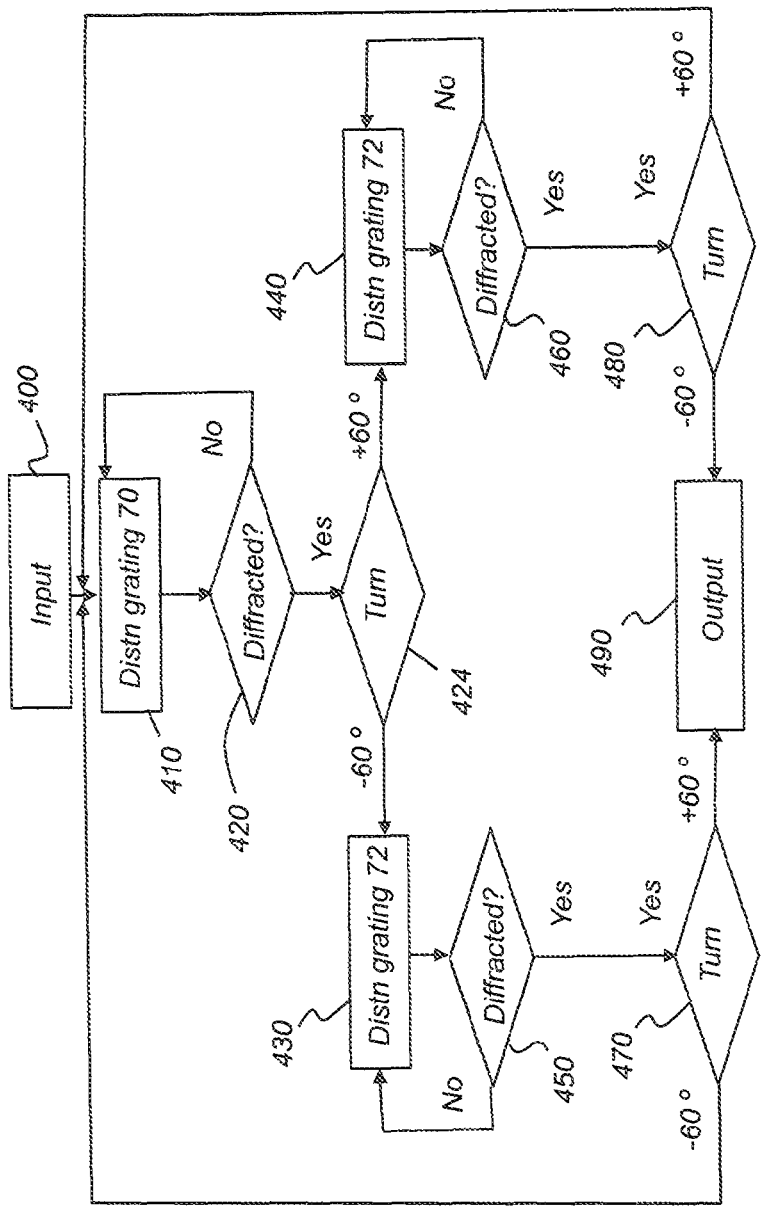
FIG. 11 is a flow diagram that shows light processing and distribution within a beam expander according to an embodiment of the present disclosure.

The flow chart shown in FIG. 11 describes how beam expander 150 handles light with the arrangement of gratings shown in FIGS. 8-10. In an input step 400, light is input to in-coupling diffractive optic IDO. The light proceeds to distribution grating 70 in step 410. In step 420, diffracted light from grating 70 then proceeds to a turn step 424, wherein the light is turned to either +60 degrees or −60 degrees. Light turned −60 degrees proceeds to a diffraction step 430 in diffraction grating 72. Undiffracted light is cycled in step 450. Diffracted light proceeds to a turn step 470 and is redirected at either +/−60 degrees. Similarly, light turned +60 degrees proceeds to a diffraction step 440 in diffraction grating 72. Undiffracted light is cycled in step 460. Diffracted light proceeds to a turn step 480 and is redirected at either +/−60 degrees. Light is output from out-coupling diffractive optic ODO in an output step 490. It should be noted that FIG. 11 identifies the predominant light path, approximating the light handling behavior for much of the light within the beam expander. All of the light does not undergo diffraction at various interfaces, for example.

According to an embodiment of the present disclosure, the gratings are formed on the same side of the beam expander 150 or 160 substrate.

Figure 12:
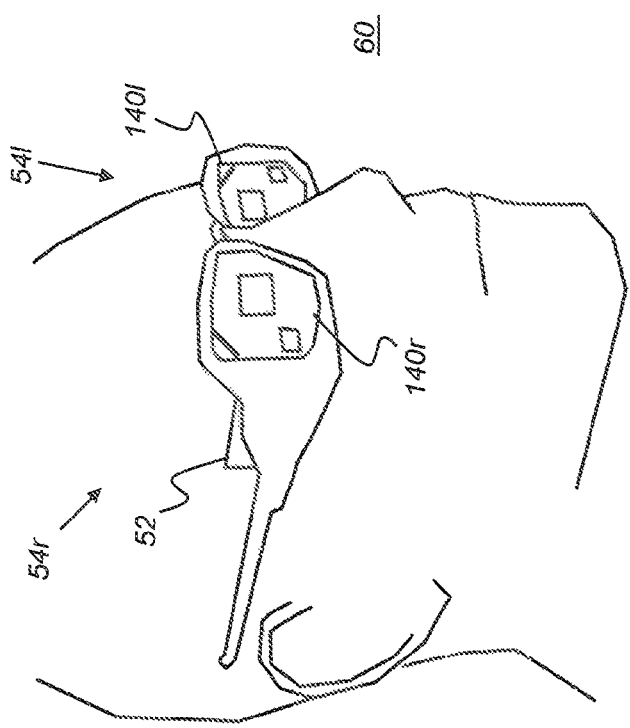
FIG. 12 is a perspective view that shows a display system for augmented reality viewing using imaging light guides of the present disclosure.

The perspective view of FIG. 12 shows a display system 60 for three-dimensional (3-D) augmented reality viewing using a pair of imaging light guides of the present disclosure. Display system 60 is shown as an HMD with a left-eye optical system 54l having a beam expander 140l for the left eye and a corresponding right-eye optical system 54r having a beam expander 140r for the right eye. An image source 52, such as a picoprojector or similar device, can be provided, energizable to generate a separate image for each eye, formed as a virtual image with the needed image orientation for upright image display. The images that are generated can be a stereoscopic pair of images for 3-D viewing. The virtual image that is formed by the optical system can appear to be superimposed or overlaid onto the real-world scene content seen by the viewer. Additional components familiar to those skilled in the augmented reality visualization arts, such as one or more cameras mounted on the frame of the HMD for viewing scene content or viewer gaze tracking, can also be provided. Alternate arrangements are possible, including a display apparatus for providing an image to one eye.

Beam Expander Fabrication

In-coupling and out-coupling diffractive optics IDO and ODO can be diffraction gratings or formed as volume holograms, or formed from a holographic polymer dispersed liquid crystal, for example. The waveguide substrate S of the beam expander is typically glass or other optical material with sufficient index of refraction for supporting TIR transmission between in-coupling diffractive optic, distribution gratings, and out-coupling diffractive optic.

In-coupling diffractive optics IDO, distribution gratings 70, 72, and out-coupling diffractive optics ODO can have different grating periods appropriate to their functions. After proper surface preparation of a glass substrate blank, the diffraction components can formed on one or both outer surfaces of the beam expander using nano-imprinting methods, for example. At least one of the in-couplings and out-couplings can be a surface relief diffraction grating.

The invention has been described in detail with particular reference to presently preferred embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An imaging light guide for conveying a virtual image comprising:
    a waveguide that defines a light path that conveys image-bearing light, the waveguide formed as a flat plate having a front surface and a back surface, wherein the light path comprises:
        (i) an in-coupling diffractive optic formed on the front surface and having a first grating vector wherein the in-coupling diffractive optic diffracts an image-bearing light beam directed into the waveguide and directs the diffracted light along the light path according to the first grating vector;
        (ii) an out-coupling diffractive optic spaced apart from the in-coupling diffractive optic and formed on the front or back surface as a diffractive array comprising:
            a first subset of diffractive elements, each element having a second grating vector that is offset from the first grating vector by about +60 degrees;
            a second subset of diffractive elements, each element having a third grating vector that is offset from the first grating vector by about −60 degrees;
        wherein each diffractive element of the first subset is immediately adjacent to at least one diffractive element of the second subset and wherein the diffractive elements of the first and second subsets are mutually non-overlapping.

2. The imaging light guide of claim 1 wherein the in-coupling diffractive optics are diffraction gratings.

3. The imaging light guide of claim 1 wherein the diffractive optics are volume holograms.

4. The imaging light guide of claim 1 wherein the diffractive optics are holographic polymer dispersed liquid crystal.

5. The imaging light guide of claim 1 wherein the diffractive optics are surface relief diffraction gratings.

6. The imaging light guide of claim 1 further comprising a third subset of diffractive elements, each element having a grating vector that is parallel to the first grating vector.

7. The imaging light guide of claim 1 wherein the first subset of diffractive elements have a rectangular shape.

8. The imaging light guide of claim 1 wherein the first subset of diffractive elements have a hexagonal or triangular shape.

9. The imaging light guide of claim 1 further comprising one or more additional distribution gratings disposed along the light path between the in-coupling and out-coupling diffractive optics.

10. An imaging light guide for conveying a virtual image comprising:
    a waveguide that defines a light path that conveys image-bearing light, the waveguide formed as a flat plate having a front surface and a back surface, wherein the light path comprises:

(i) an in-coupling diffractive optic formed on the front surface and having an input grating vector wherein the in-coupling diffractive optic diffracts an image-bearing light beam directed into the waveguide and directs the diffracted light along the light path according to the input grating vector;

(ii) an out-coupling diffractive optic, spaced apart from the in-coupling diffractive optic, formed on the front surface as a diffractive array and having an arrangement of diffractive optical elements having alternating first and second grating vectors that differ from each other by about 120 degrees, wherein light diffracted according to the first grating vector is output when incident on a diffractive optical element having the second grating vector and light diffracted according to the second grating vector is output when incident on a diffractive optical element having the first grating vector.

11. The imaging light guide of claim 10 wherein the diffractive optical elements of the out-coupling diffractive optic further have a third grating vector that differs from the first and second grating vectors by at least 60 degrees.

12. A method for conveying a virtual image comprising:

directing image-bearing light into a waveguide, wherein the waveguide is formed as a flat plate having a front surface and a back surface; and conveying the image-bearing light along a light path defined between the front and back surfaces and having:

(i) an in-coupling diffractive optic formed on the front surface and having an input grating vector wherein the in-coupling diffractive optic diffracts the image-bearing light directed into the waveguide and directs the diffracted light along the light path according to the input grating vector;

(ii) an out-coupling diffractive optic that forms the virtual image, the out-coupling diffractive optic spaced apart from the in-coupling diffractive optic, formed on the front or back surface as a diffractive array and having an arrangement that has immediately adjacent diffractive optical elements having alternating first and second grating vectors that differ from each other by about 120 degrees, wherein light diffracted according to the first grating vector is output when incident on a diffractive optical element having the second grating vector and light diffracted according to the second grating vector is output when incident on a diffractive optical element having the first grating vector.

13. The method of claim 12 wherein the diffractive optical elements of the out-coupling diffractive optic further have a third grating vector that differs from the first and second grating vectors by at least 60 degrees.

* * * * *